US006567803B1

(12) United States Patent
Ramasamy et al.

(10) Patent No.: US 6,567,803 B1
(45) Date of Patent: May 20, 2003

(54) SIMULTANEOUS COMPUTATION OF MULTIPLE MOVING AGGREGATES IN A RELATIONAL DATABASE MANAGEMENT SYSTEM

(75) Inventors: Karthikeyan Ramasamy, Madison, WI (US); Prasad Manikarao Deshpande, Madison, WI (US); Amit Shukla, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 342 days.

(21) Appl. No.: 09/583,633

(22) Filed: May 31, 2000

(51) Int. Cl.[7] .............................. G06F 17/30; G06F 7/00
(52) U.S. Cl. ....................... 707/4; 707/2; 707/3; 707/5; 707/102; 707/104.1
(58) Field of Search ................................ 707/2, 3, 4, 5, 707/102, 104.1

(56) References Cited

U.S. PATENT DOCUMENTS 5,546,570 A * 8/1996 McPherson et al. ........... 707/2
5,850,547 A * 12/1998 Waddington et al. ....... 709/102
6,081,801 A * 6/2000 Cochrane et al. ........... 707/201
6,275,818 B1 * 8/2001 Subramanian et al. ......... 707/2
6,289,334 B1 * 9/2001 Reiner et al. ................. 707/10

OTHER PUBLICATIONS

N. Kabra and D.J. DeWitt (1999) "OPT++: an object–oriented implementation for extensible database query optimization," The VLDB Journal 8:55–78.

* cited by examiner

Primary Examiner—Jean R. Homere
(74) Attorney, Agent, or Firm—Gates & Cooper

(57) ABSTRACT

An On-Line Analytic Processing (OLAP) system identifies a plurality of simultaneously computable moving aggregate functions in a query. The identified moving aggregate functions are then partitioned into sets that can be computed simultaneously based on equivalent sort expressions. Finally, the OLAP system generates an access plan that executes the partitioned sets simultaneously.

11 Claims, 6 Drawing Sheets

```
SELECT PRODUCT.NAME,
       MAVG(SALES.TOTAL, 3, SALES.MONTH),
       MSUM(SALES.TOTAL, 3, SALES.MONTH)
FROM PRODUCT, SALES
WHERE PRODUCT.NO = SALES.PRODUCTNO
```

SIMULTANEOUS COMPUTATION OF MULTIPLE MOVING AGGREGATES IN A RELATIONAL DATABASE MANAGEMENT SYSTEM

CROSS REFERENCE TO RELATED APPLICATIONS

This application is related to the following co-pending and commonly assigned patent applications, all of which are incorporated by reference herein:

application Ser. No. 09/605,202, entitled "METHOD FOR DETERMINING THE COMPUTABILITY OF DATA FOR AN ACTIVE MULTI-DIMENSIONAL CACHE IN A RELATIONAL DATABASE MANAGEMENT SYSTEM," filed on Jun. 27, 2000, by Prasad M. Deshpande, Karthikeyan Ramasamy, Amit Shukla, and Jeffrey F. Naughton, application Ser. No. 09/583,364, entitled "ACTIVE CACHING FOR MULTI-DIMENSIONAL DATA SETS IN A RELATIONAL DATABASE MANAGEMENT SYSTEM," filed on May 31, 2000, by Prasad M. Deshpande, Karthikeyan Ramasamy, Amit Shukla, and Jeffrey F. Naughton; and application Ser. No. 09/449,085, entitled "QUERY MONITOR PLAYBACK MECHANISM FOR POST-MORTEM PERFORMANCE ANALYSIS," filed on Nov. 24, 1999, by Karthikeyan Ramasamy, Jie-Bing Yu, and Jun Li.

BACKGROUND OF THE INVENTION

1. Field of the Invention

This invention relates in general to database management systems performed by computers, and in particular, to the simultaneous computation of multiple moving aggregates for an on-line analytical processing (OLAP) system that uses a relational database management system (RDBMS).

2. Description of Related Art.

On-Line Analytical Processing (OLAP) systems provide tools for analysis of multidimensional data. Most systems are built using a three-tier architecture, wherein the first or client tier provides a graphical user interface (GUI) or other application, the second or middle tier provides a multi-dimensional view of the data, and the third or server tier comprises a relational database management system (RDBMS) that stores the data.

Most queries in OLAP systems are complex and require the aggregation of large amounts of data. In OLAP systems, expressions and aggregates are often generated by user-defined metrics. Examples of such metrics include running averages of sales over various time windows, actual vs. forecast profit margins, and many others. Often, one metric is defined in terms of another, e.g., profit may be defined in terms of sales and various costs. Frequently, a single user query will request multiple metrics, and each metric may have many component sub-metrics. The result is a complex set of expressions and aggregates, which provide the potential for sharing and re-use during evaluation.

However, decision support applications in OLAP systems need to be interactive and demand fast response times. Different techniques to speed up queries have been studied and implemented, both in research and industrial systems. Generally, these different techniques do not provide dramatic performance improvements. Thus, there is a need in the art for improved performance in OLAP systems.

SUMMARY OF THE INVENTION

An On-Line Analytic Processing (OLAP) system identifies a plurality of simultaneously computable moving aggregate functions in a query. The moving aggregate functions are then partitioned into sets that can be computed simultaneously based on equivalent sort expressions. Finally, the OLAP system generates an access plan that executes the partitioned sets simultaneously.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention provides a solution for computing many moving aggregates together when they are requested in a query. The solution can be categorized in three phases:

Identifying simultaneously computable moving aggregates—This phase partitions the set of moving aggregates into smaller sets such that each smaller set can be computed simultaneously.

Plan transformation—This phase transforms the generated plan, so that appropriate operators are added for the computation of moving aggregates.

Plan execution—This phase performs the actual computation of moving aggregates. Efficient moving aggregate operators are implemented and are invoked during computation.

HARDWARE AND SOFTWARE ENVIRONMENT

Figure 1:
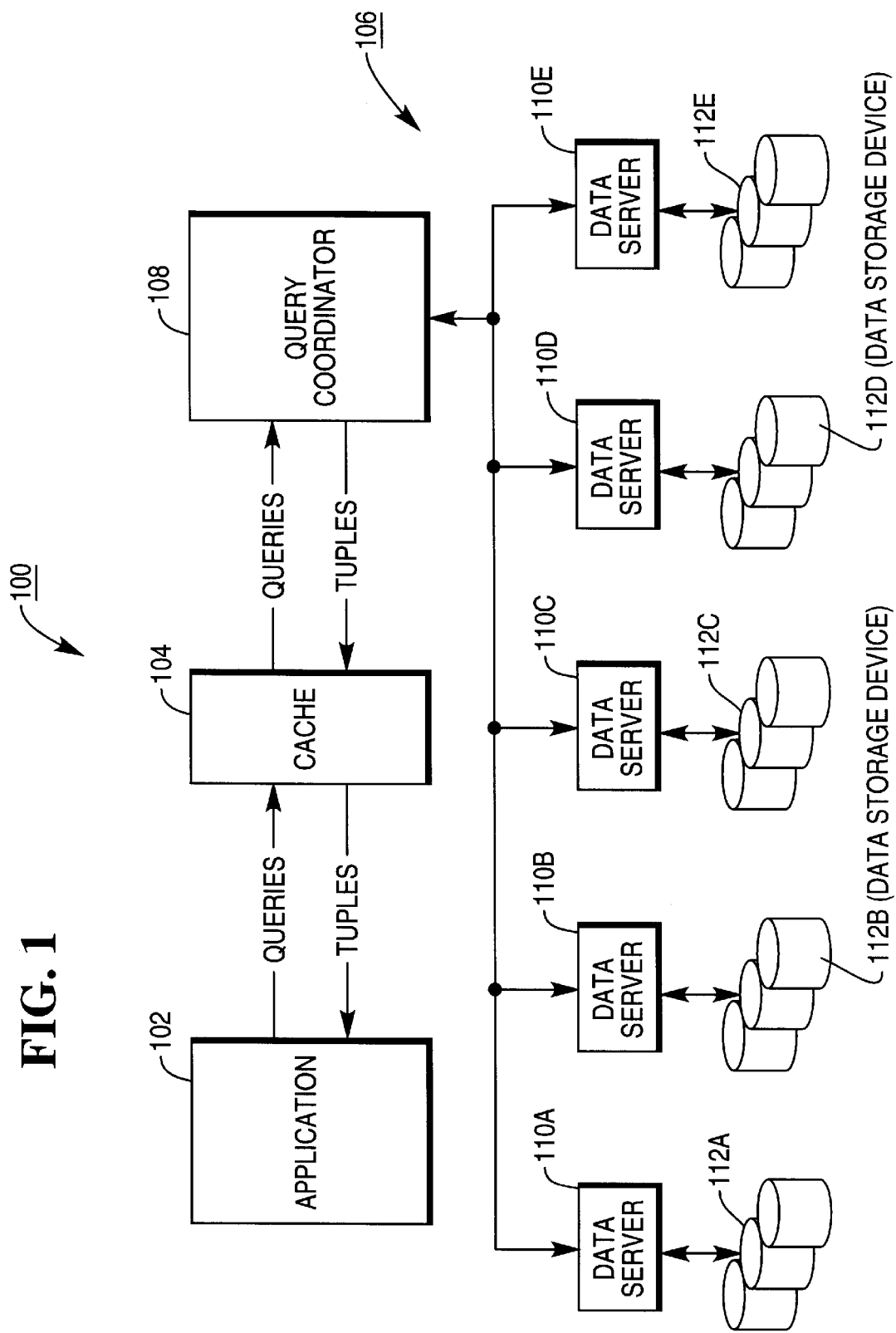
FIG. 1 illustrates an exemplary hardware and software environment that could be used with the present invention.

FIG. 1 illustrates an exemplary hardware and software environment that could be used with the present invention. In the exemplary environment, a computer system 100 implements an OLAP (On-Line Analytic Processing) system in a three-tier client-server architecture, wherein the first or client tier provides a graphical user interface (GUI) or other application 102, the second or middle tier provides a cache 104 for storing multi-dimensional data, and the third or server tier comprises a relational database management system (RDBMS) 106 that generates the multi-dimensional data from tables stored in a relational database.

In the preferred embodiment, the RDBMS 106 includes a query coordinator 108 and one or more data servers 110A–110E storing the relational database in one or more data storage devices 112A–112E. The query coordinator 108 and data servers 110 maybe implemented in separate machines, or may be implemented as separate or related processes in a single machine. The RDBMS 106 used in the preferred embodiment comprises the Teradata® RDBMS sold by NCR Corporation, the assignee of the present invention.

In the preferred embodiment, the system 100 may use any number of different parallelism mechanisms. Tables within the relational database maybe fully partitioned across all data storage devices 112 in the system 100 using hash, range, value, or other partitioning methods. Generally, the data servers 110 perform operations against the relational database in a parallel manner as well.

Generally, the application 102, cache 104, RDBMS 106, query coordinator 108, and/or data servers 11A–110E comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

EXECUTION OF SQL QUERIES

Figures 2, 3:
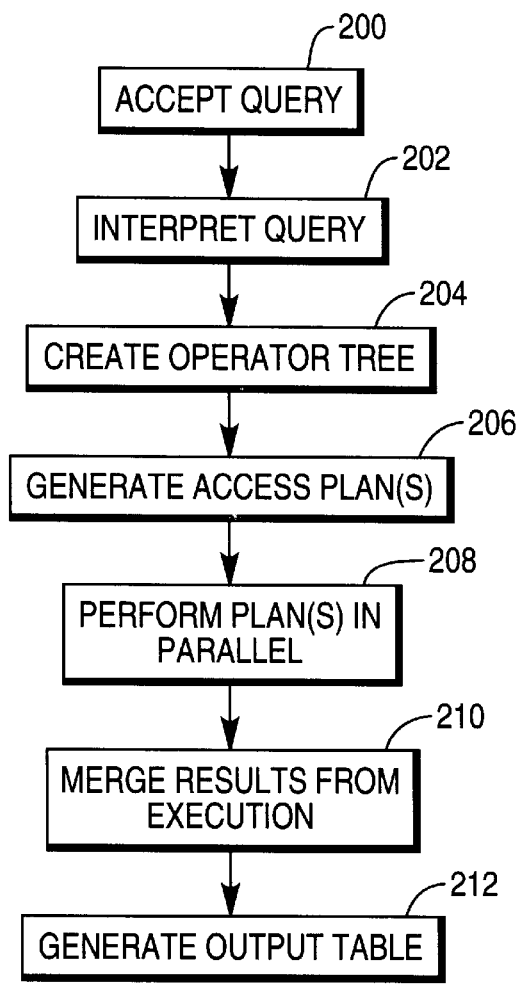
FIG. 2 is a flowchart that illustrates the general processing of queries according to the preferred embodiment of the present invention.
FIGS. 3, 4, and 5 present an example SQL query, an associated operator tree, and an associated access plan.

FIG. 2 is a flow chart illustrating the steps necessary for the interpretation and execution of queries or other user interactions, either in a batch environment or in an interactive environment, according to the preferred embodiment of the present invention.

Block 200 represents a query being accepted by the query coordinator 108.

Block 202 represents the query coordinator 108 transforming the query into an operator tree.

Block 204 represents the query coordinator 108 generating one or more access plans from the operator tree.

Block 206 represents the query coordinator 108 parallelizing the access plans, and then transmitting the access plans to their assigned data servers 110.

Block 208 represents the data servers 110 performing the required data manipulation associated with the access plans received from the query coordinator 108, wherein the access plans are performed in parallel by the data servers 110.

Block 210 represents the query coordinator 108 then merging the results received from the data servers 110, and optionally storing the results into the data cache 104.

Block 212 represents the output or result table being generated from the merged results, so that the responses can ultimately be delivered to the application 102.

OPERATOR TREES AND ACCESS PLANS

Figure 4:
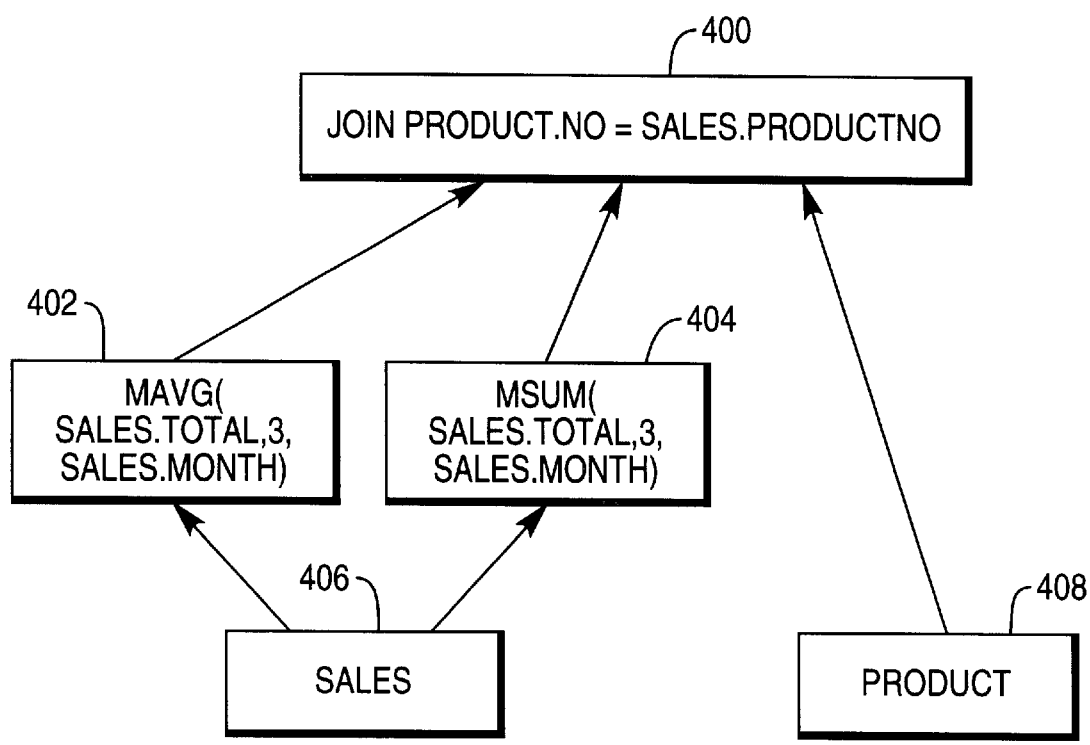
Figure 5:
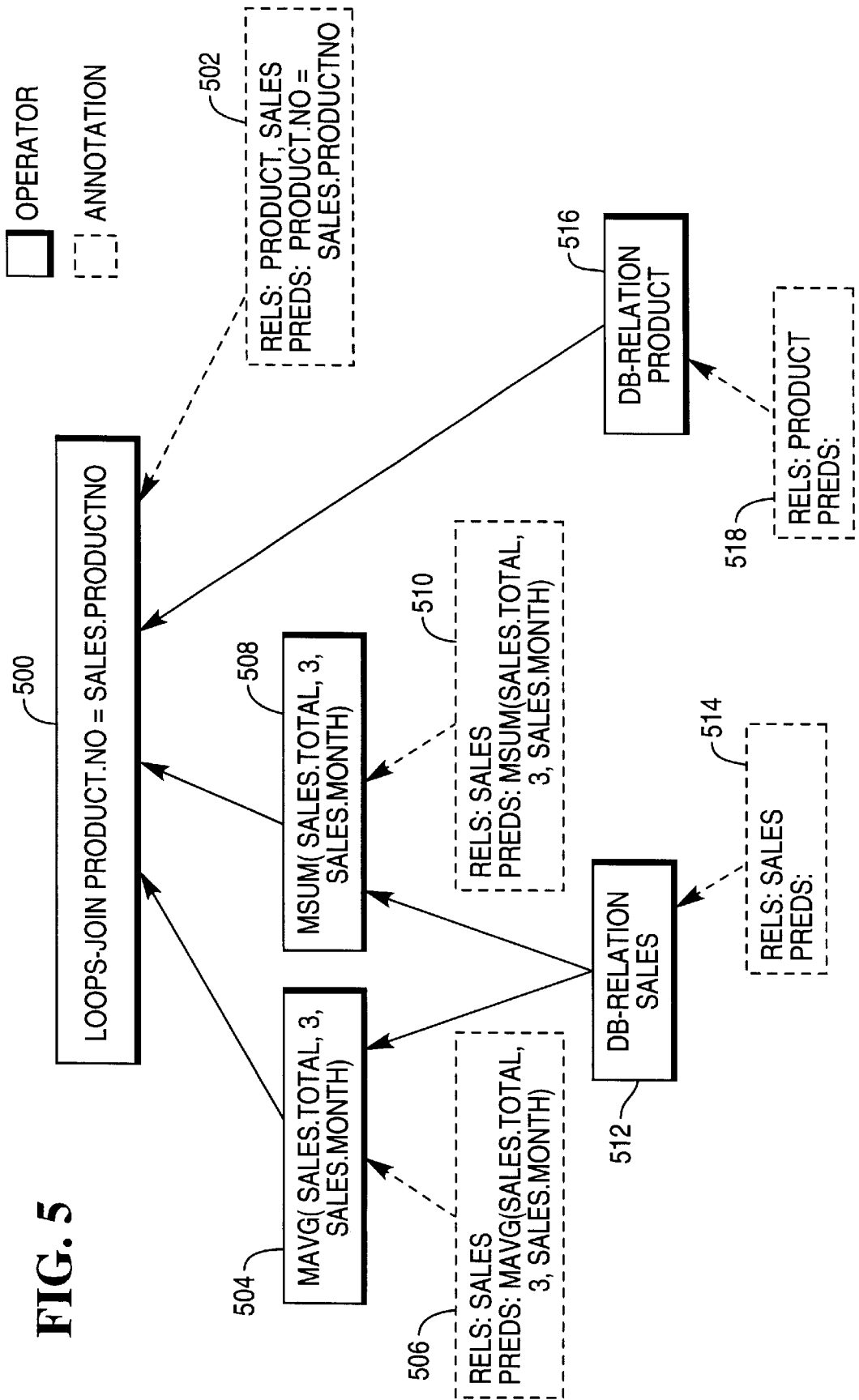

FIGS. 3, 4, and 5 present an example SQL query, an associated operator tree, and an associated access plan. The SQL query of FIG. 3 is converted from its textual form to one or more equivalent operator trees as shown in FIG. 4, and each of the operator trees can be represented as one or more access plans as shown in FIG. 5. During the query optimization process, the query coordinator 108 must generate various operator trees that represent the SQL query (or parts of it), generate the various access plans corresponding to each operator tree, and compute/estimate various properties of the operator trees and access plans (for example, cardinality of the output relation, estimated execution cost, etc.) in order to select an optimal access plan.

FIG. 4 illustrates an operator tree generated from the query shown in FIG. 3, wherein the operator tree includes nodes 400, 402, 404, 406, and 408. The two DB-RELATION nodes 406 and 408 represent the two relations in the FROM clause of the query, i.e., "SALES" and "PRODUCT". The MAVG node 402 and MSUM node 404 represent moving aggregate functions, i.e., moving average and moving sum, on the "SALES" relation, and the JOIN node 400 represents the "PRODUCT" relation being joined to the result of the moving average and moving sum functions on the "SALES" relation.

FIG. 5 illustrates an annotated access plan generated from the operator tree shown in FIG. 4, wherein the annotated access plan includes nodes 500, 502, 504, 506, 508, 510, 512, 514, 516 and 518. The access plan specifies the operators to be executed, the expressions and predicates to be evaluated, and the aggregations to be performed. Furthermore, the access plan expresses the dependencies between operators by organizing the nodes 500, 504, 508, 512, and 516 representing the operators in the form of a tree.

The annotations 502, 506, 510, 514 and 518 in the access plan further describe the expressions and aggregations required for the access plan. The query coordinator 108 evaluates the access plan using a "tree of operators" approach. In this approach, the operator nodes 500, 504, 508, 512 and 516 accept streams of values as inputs, operate on these values, and then produce modified streams of values as outputs. The edges in the access plan describe the flow of the value streams through the access plan: (1) node 516 produces values for node 500; (2) node 512 produces values for nodes 504 and 508; (3) node 508 produces values for node 500; and (4) node 504 produces values for node 500.

The access plan is executed by making an instance of the appropriate operator for each node in the tree, with each of these operators executing in an independent thread. Streams connect these instances and move data from one operator to another operator (in a pipelined fashion). Finally, the results are pipelined to the consumer (e.g., application program 102 and/or cache 104) in tandem with the execution of the operators. All operators operate in a "push" fashion, in which data flows upwards to operators higher in the access plan.

MOVING AGGREGATES

The query coordinator 108 provides the ability to compute a plurality of moving aggregates when they are requested in a single query, which improves response times. Moreover, subsequent requests can be anticipated and issued a priori, with the results stored in the cache 102.

Each moving aggregate is best described by a tuple "moving-aggr-func(moving-aggr-expr, width, sort-expr)", wherein:

moving-aggr-func—is an identifier or mnemonic for the moving aggregate function, e.g., rank (MRANK), sum (MSUM), average (MAVG), difference (MDIFF), cumulative total (MCLM), etc.

moving-aggr-expr—is an expression on which the moving aggregate is computed.

width—specifies the range of tuples for computing the moving aggregates.

sort-expr—specifies a sort expression or sort order for the tuples.

The query coordinator 108 processes the moving aggregates in three phases. The query coordinator 108 first identifies simultaneously computable moving aggregates and partitions the set of moving aggregates into smaller sets, such that each smaller set can be computed simultaneously. The query coordinator 108 next transforms the access plan, so that appropriate operators are added for the computation of moving aggregates. Finally, the query coordinator 108 performs the actual computation of moving aggregates using efficient moving aggregate operators.

During access plan generation, the dependencies of user-defined metrics and the sharing of their computation is taken into account. Based on the dependencies, the moving aggregates are placed in the appropriate operators.

In the first phase of processing the moving aggregates, the simultaneously computable moving aggregates are identified. For each operator node in the access plan containing moving aggregates, the moving aggregates are identified and then partitioned based on their sort expressions. In order to simultaneously compute many moving aggregates, the sort expressions have to be equivalent. Such equivalence guarantees that only a single sort is required for that partition, thus saving the cost of multiple sorts.

To identify the equivalence of sort expressions, tree isomorphism is evaluated in a recursive fashion by first checking whether the root of the trees are equivalent. If so, then the left child of the first tree is compared with the left child of the second tree. If the comparison fails, then the right child of the first tree is compared to the right child of the second tree. If this comparison also fails, then the sort expressions are not equivalent, and the tree is not isomorphic. Otherwise, the comparison continues until all the nodes in both the trees have been verified as equivalent or not.

Once the moving aggregates are partitioned into smaller simultaneously computable sets, the access plan is transformed. Each operator node in the access plan containing moving aggregates is expanded into a set of operators equal to the number of simultaneously computable sets. Each set is computed in one of these operators in a mutually exclusive fashion. A sort operator is added before each of these newly added operators, so that the tuples are in the correct sort order.

During access plan execution, there are various options to implement the moving aggregate operator. A first approach is to cache 102 the set of tuples equivalent to the highest width moving aggregate being computed by an operator. For each output tuple to be generated, an appropriate set of tuples in the cache 102 are used in the calculation of each moving aggregate and the result is generated immediately.

However, there are two problems with this approach. First, it is not scalable by width, and as the width increases, more memory will be required. Also, some tuples are repeatedly involved in the computation, which will increase processing overhead.

This leads to a second approach, where only the first and last tuples in the width are cached 102. This has the advantage of consuming smaller amounts of memory, but requires two synchronized scans, one after the other. Only the sum of the moving-aggr-expr and the "count" of the tuples in the width are maintained. During the computation, the first output going tuple is used to subtract the value from the sum and the value from new incoming tuple is added and the scans are advanced.

Even though this approach looks attractive for a single moving aggregate computation, it suffers from severe drawbacks when multiple aggregates are computed simultaneously. Since the width of each moving aggregate can be different, the query coordinator 108 needs to keep track of the first tuples in the width for all possible widths. This requires that the number of synchronized scans be equal to the number of unique "widths" +1, which adds to the overhead of fetching the tuples.

A hybrid approach using the best of both approaches is used in a preferred embodiment, wherein a cache 102 of tuples of highest width is maintained and a set of pointers within the cache 102 are maintained to point to the first tuples for each different width. Since the width is not usually very large, this approach reduces the processing overhead and consumes less memory. Also, the insertion of sort operators might incur unnecessary overhead, if the number of tuples is not very large. Hence, the evaluation of moving aggregations is sometimes piggybacked with the sort operator for efficiency purposes.

LOGIC OF THE PREFERRED EMBODIMENT

Figure 6A:
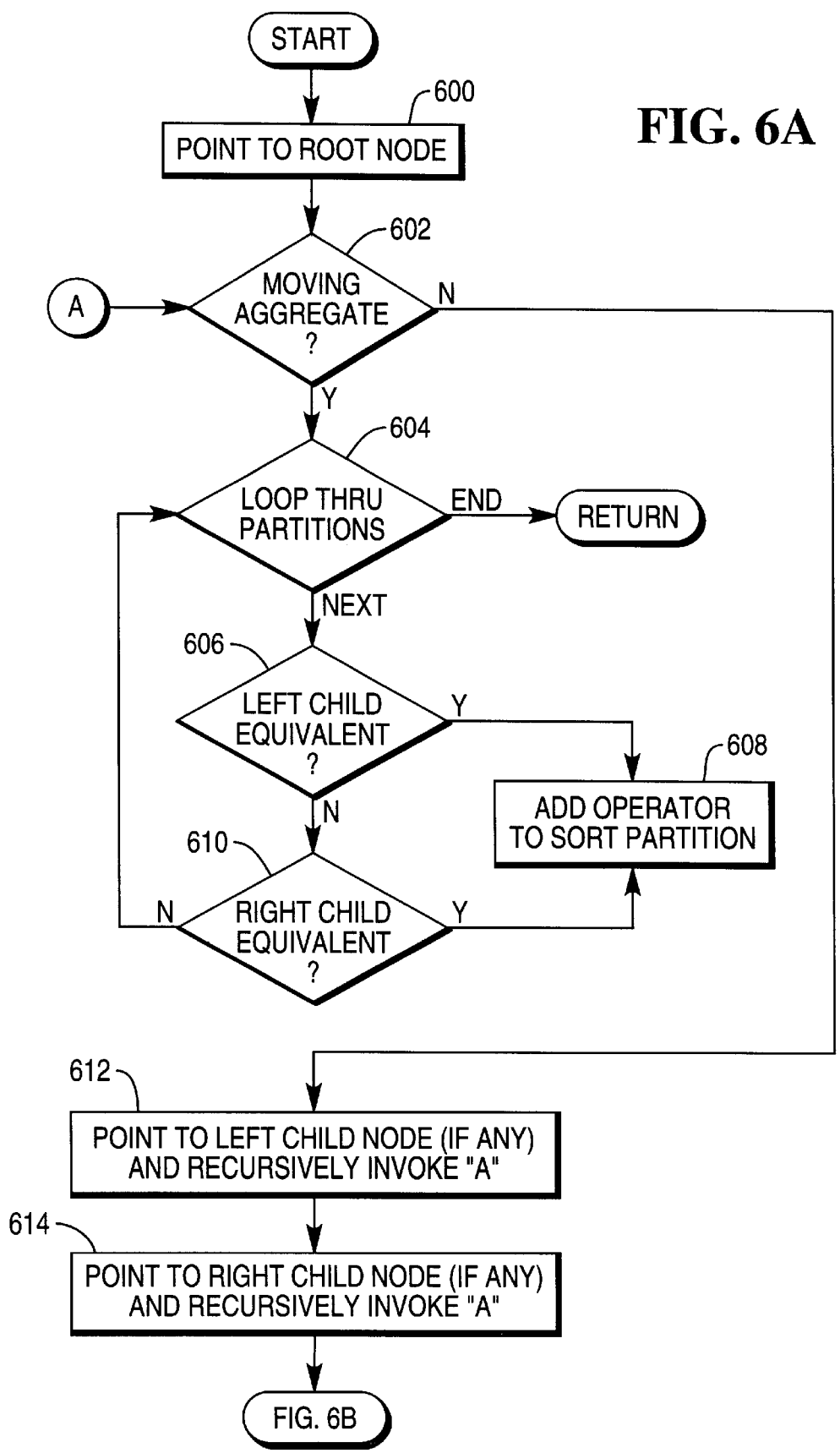
FIGS. 6A and 6B together are a flowchart that illustrates the logic performed according to the preferred embodiment of the present invention.
Figure 6B:
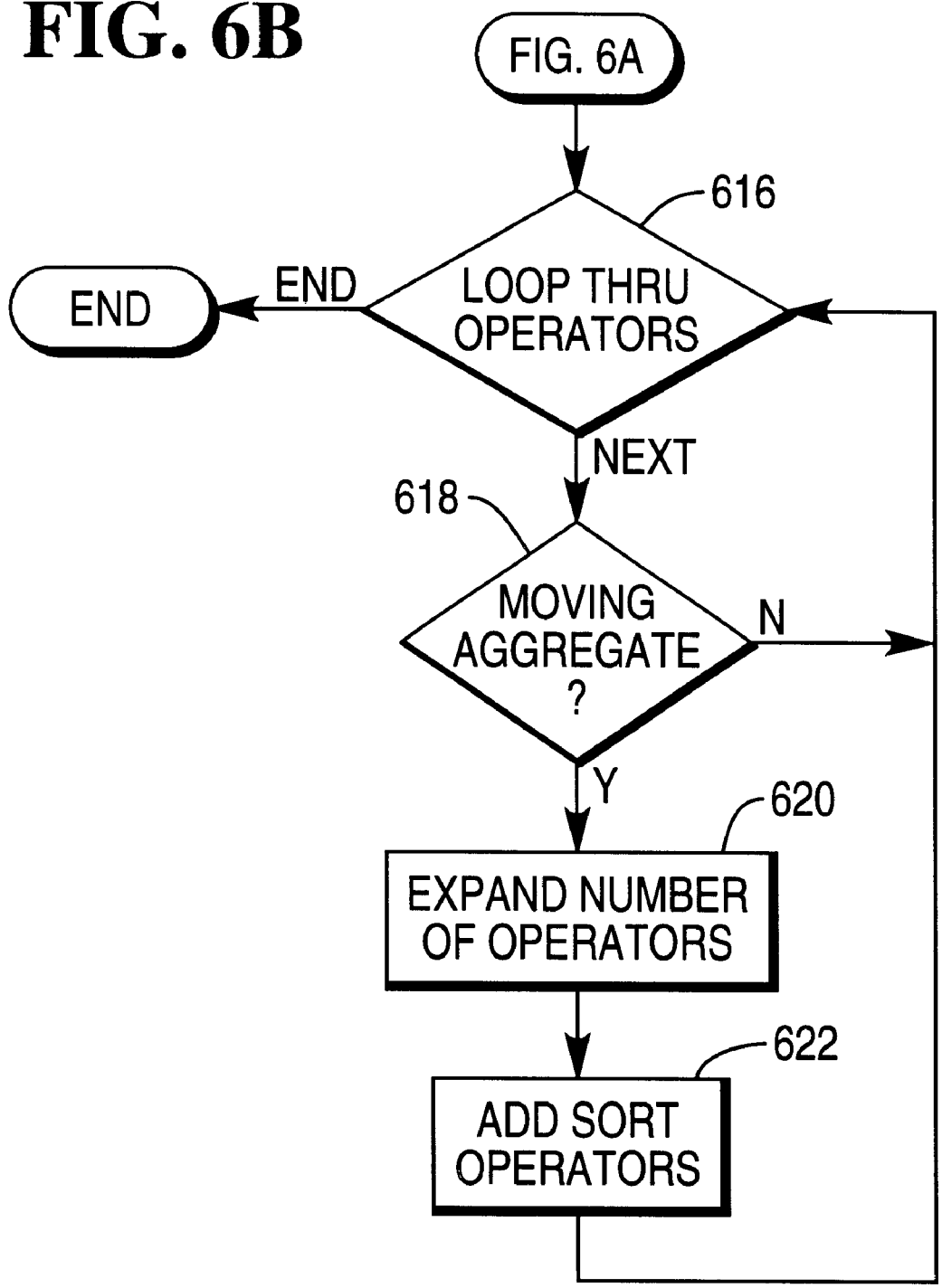

FIGS. 6A and 6B together are a flowchart that illustrates the logic performed according to the preferred embodiment of the present invention.

Referring to FIG. 6A, Block 600 represents the query coordinator 108 pointing to the root node (operator) of the access plan.

Block 602 is a decision block that represents the query coordinator 108 determining whether the operator contains a moving aggregate. If so, control transfers to Block 604; otherwise, control transfers to Block 612.

Block 604 is a decision block that represents the query coordinator 108 performing a loop through all of the partitions of equivalent sort expressions. For each iteration, control transfers to Block 606; upon completion of the loop, a return is executed.

Block 606 is a decision block that represents the query coordinator 108 determining whether the left child of the operator containing the moving aggregate is equivalent to the left child of an operator associated with the partition. If so, control transfers to Block 608; otherwise, control transfers to Block 610.

Block 610 is a decision block that represents the query coordinator 108 determining whether the right child of the operator containing the moving aggregate is equivalent to the right child of the operator associated with the partition. If so, control transfers to Block 608; otherwise, control transfers to Block 604.

Block 612 represents the query coordinator 108 traversing the access plan from the current node to point to its left child node (if any), and if a left child node exists, then recursively invoking the logic of FIG. 6A via the entry point labeled "A".

Block 614 represents the query coordinator 108 traversing the access plan from the current node to point to its right child node (if any), and if a right child node exists, then recursively invoking the logic of FIG. 6A via the entry point labeled "A".

Thereafter, control transfers to FIG. 6B.

Referring to FIG. 6B, Block 616 is a decision block that represents the query coordinator 108 performing a loop through all of the operators in the access plan. For each iteration, control transfers to Block 618; upon completion of the loop, the logic ends.

Block 618 is a decision block that represents the query coordinator 108 determining whether the operator contains a moving aggregate. If so, control transfers to Block 620; otherwise, control transfers to Block 616.

Block 620 represents the query coordinator 108 expanding the operator node in the access plan into a set of operators equal to the number of simultaneously computable sets to which the operator node belongs.

Block 622 represents the query coordinator 108 adding a sort operator before each of the newly added operators from Block 616, so that the tuples are in the correct sort order.

Thereafter, control transfers to Block 616.

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses an On-Line Analytic Processing (OLAP) system that identifies a plurality of simultaneously computable moving aggregate functions in a query. The moving aggregate functions are then partitioned into sets that can be computed simultaneously based on equivalent sort expressions. Finally, the OLAP system generates an access plan that executes the partitioned sets simultaneously.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for computing moving aggregates in an on-line analytical processing (OLAP) system, comprising:
   (a) identifying a plurality of simultaneously computable moving aggregate functions in a query, and
   (b) partitioning the identified moving aggregate functions into sets that can be computed simultaneously, and
   (c) generating an access plan that executes the partitioned sets simultaneously.

2. The method of claim 1, wherein a moving aggregate function is described by a tuple including a mnemonic for the function, an expression for the function, a width of tuples for computing the function, and a sort order for the function.

3. The method of claim 2, wherein the sort orders for simultaneously computable moving aggregate functions are equivalent.

4. The method of claim 3, wherein the simultaneously computable moving aggregate functions are partitioned into sets based on their sort orders.

5. The method of claim 4, further comprising performing only a single sort for each of the partitioned sets.

6. The method of claim 5, further comprising evaluating tree isomorphism for the access plan to identify equivalent sort orders.

7. The method of claim 6, wherein the evaluating step comprises checking, in a recursive fashion, whether operator trees of two or more access plans are equivalent.

8. The method of claim 1, wherein the generating step comprises expanding each operator node in the access plan containing moving aggregate functions into a set of operators equal to a number of sets.

9. The method of claim 8, wherein each set is computed in a mutually exclusive fashion.

10. An on-line analytical processing (OLAP) system that computes moving aggregates, comprising:
    (a) a computer system;
    (b) logic, performed by the computer system, for:
       (1) identifying a plurality of simultaneously computable moving aggregate functions in a query, and
       (2) partitioning the identified moving aggregate functions into sets that can be computed simultaneously; and
       (3) generating an access plan that executes the partitioned sets simultaneously.

11. An article of manufacture embodying logic for computing moving aggregates in an on-line analytical processing (OLAP) system, the logic comprising:
    (a) identifying a plurality of simultaneously computable moving aggregate functions in a query; and
    (b) partitioning the identified moving aggregate functions into sets that can be computed simultaneously; and
    (c) generating an access plan that executes the partitioned sets simultaneously.

* * * * *